Figure 1:
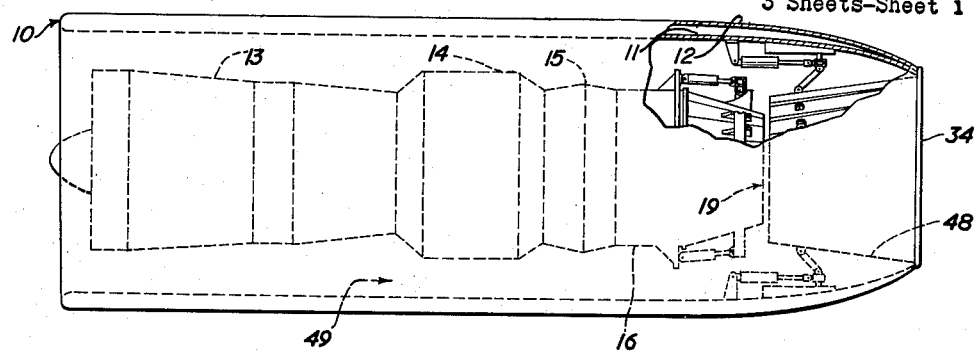

May 16, 1961  H. C. EATOCK  2,984,068
PROPULSIVE NOZZLE SYSTEM FOR REACTION PROPULSION UNITS
Filed June 30, 1958  3 Sheets-Sheet 1

INVENTOR
HENRY CLARE EATOCK
BY Maybee & Legris
ATTORNEYS

May 16, 1961   H. C. EATOCK   2,984,068
PROPULSIVE NOZZLE SYSTEM FOR REACTION PROPULSION UNITS
Filed June 30, 1958   3 Sheets-Sheet 2

INVENTOR
HENRY CLARE EATOCK
BY Maybee & Legris
ATTORNEYS

May 16, 1961  H. C. EATOCK  2,984,068
PROPULSIVE NOZZLE SYSTEM FOR REACTION PROPULSION UNITS
Filed June 30, 1958  3 Sheets-Sheet 3

INVENTOR
HENRY CLARE EATOCK
BY Maybee & Legris
ATTORNEYS

United States Patent Office 2,984,068
Patented May 16, 1961

2,984,068

PROPULSIVE NOZZLE SYSTEM FOR REACTION PROPULSION UNITS

Henry Clare Eatock, Streetsville, Ontario, Canada, assignor to Orenda Engines Limited, Malton, Ontario, Canada, a corporation Filed June 30, 1958, Ser. No. 745,572

5 Claims. (Cl. 60—35.6)

This invention relates to a propulsive nozzle system for a reaction propulsion unit of the type used in aircraft.

A propulsive nozzle on a modern aircraft has to function over a wide range of Mach numbers extending from zero at the start of take-off to between 0.8 and 4 at the top speed of the aircraft. Over this range of Mach numbers, the nozzle pressure ratio (which is the ratio of the total pressure upstream of the nozzle to the ambient atmospheric pressure) will also vary over a considerable range. At low speeds the pressure ratio will be small while at high speeds the pressure ratio will be considerably larger due to the increase in the ram pressure. Moreover, in a gas turbine engine, the pressure ratio will be low at low engine throttle setting and high at high engine throttle settings since the pressure through the engine increases as the compressor speed is increased. It is seen therefore, that in both a gas turbine engine and a ram jet engine the nozzle pressure ratio increases as the flight speed is increased and also, in gas turbine engines, as the engine throttle setting is increased.

The purpose of the propulsive nozzle is to convert the energy of the propulsive gases delivered by the reaction propulsion unit into propulsive thrust as efficiently as possible. This is very difficult for a single fixed nozzle to accomplish over the wide range of pressure ratios which are encountered between the start of take-off and the top speed at which the engine operates.

At low nozzle pressure ratios, up to about say 4, a fixed area convergent nozzle is satisfactory and is standard practice. If the convergent nozzle is used in combination with an approximately cylindrical, or slightly convergent, ejector nozzle an increase in thrust may be obtained. The ejector nozzle mixes the propulsive gases with a flow of secondary air to increase the mass flow and to lower the speed of flow. This increased mass flow has a better propulsive efficiency than the unmixed gases and an increase in thrust can result if the pressure losses which occur during the mixing of the propulsive gases and secondary air, and in the obtaining of the secondary air from atmosphere, are not excessive.

At high nozzle pressure ratios a convergent-divergent nozzle is normally used to obtain large thrusts. At low pressure ratios the expansion provided by the divergent portion of the nozzle is too great and the very low pressures which occur on the divergent walls result in substantial loss of thrust. At still lower pressure ratios, the propulsive gases detach themselves from the divergent walls, which stops the over expansion, but the larger than necessary exit area provides a substantial drag.

A divergent ejector used in combination with a convergent nozzle has properties intermediate between those of a combination of a convergent nozzle with a cylindrical ejector on the one hand, and a convergent-divergent nozzle on the other hand. Thus at low nozzle pressure ratios it tends to over-expand the propulsive gases with a consequent loss of thrust.

At intermediate nozzle pressure ratios of between say 4 and 8, a standard convergent nozzle loses thrust by not expanding the propulsive gases down to the ambient atmospheric pressure. The use of an ejector in combination with a convergent nozzle has the following advantages: firstly it increases the thrust by an increased propulsive efficiency; secondly, the ejector provides an aerodynamic expansion passage to expand the primary propulsive gases to near atmospheric pressure; and, thirdly, the secondary ejector air usually cools the engine and at the same time absorbs waste heat; the waste heat given to the air increases its momentum and hence increases the total ejector thrust.

However, the use of a cylindrical, or convergent, ejector with a convergent nozzle usually requires a large amount of secondary air with the result that less room is available for expansion of the propulsive gases. At the high flight speeds usually associated with high nozzle pressure ratios, a substantial percentage of the ideal ram total pressure is lost in bringing the secondary air into the cylindrical or convergent ejector. For these reasons, a divergent ejector is preferred at high speeds.

From the foregoing discussion, it will be seen to be desirable to have a nozzle which may vary from a convergent nozzle having a cylindrical ejector for low and intermediate nozzle pressure ratios, to a convergent nozzle associated with a divergent ejector for intermediate to high pressure ratios, and, possibly, to a convergent-divergent nozzle for high nozzle pressure ratios.

An object of the invention is to provide a simple propulsive nozzle system which will operate efficiently over a wide range of nozzle pressure ratios.

A further object of the invention is to provide a propulsive nozzle system in which at low and intermediate nozzle pressure ratios the system may be adjusted to act as a convergent nozzle in combination with the cylindrical, or convergent, ejector.

A further object of the invention is to provide a propulsive nozzle system which at high nozzle pressure ratios may be adjusted to act as a convergent nozzle in combination with a divergent ejector, a convergent nozzle with a film-cooled divergent nozzle or, in the limiting case, a plain convergent-divergent nozzle.

Figure 2:
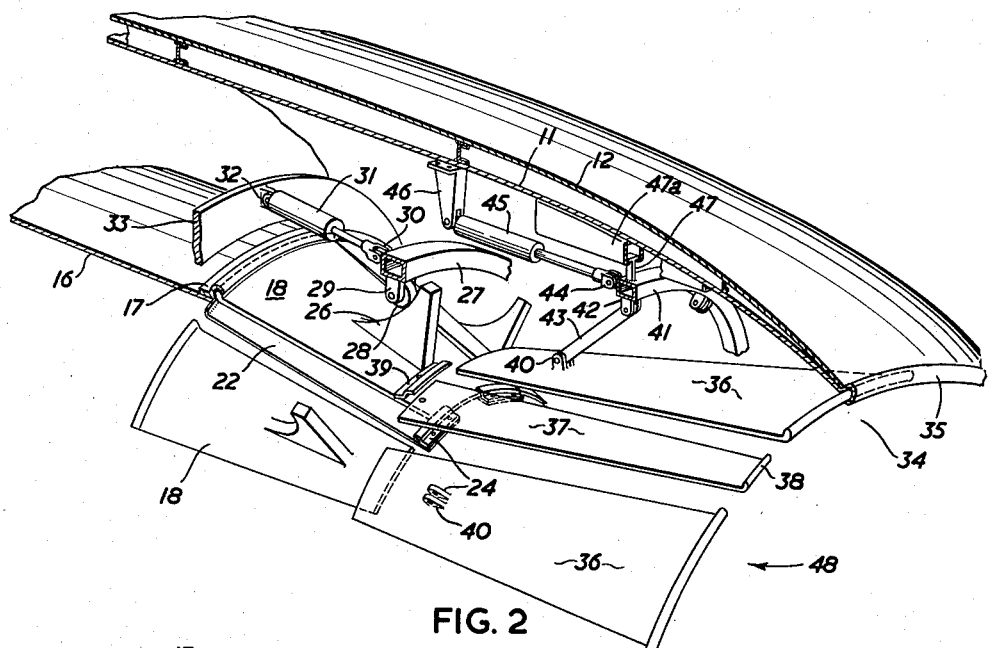
Figure 3:
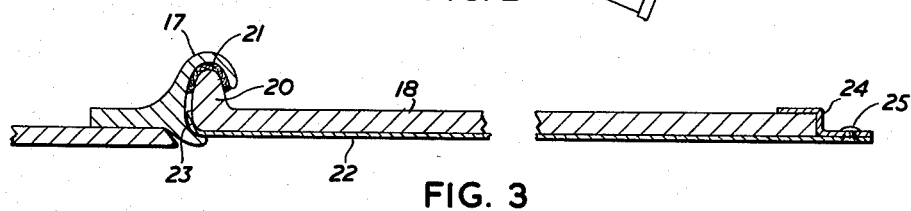
Figure 4:
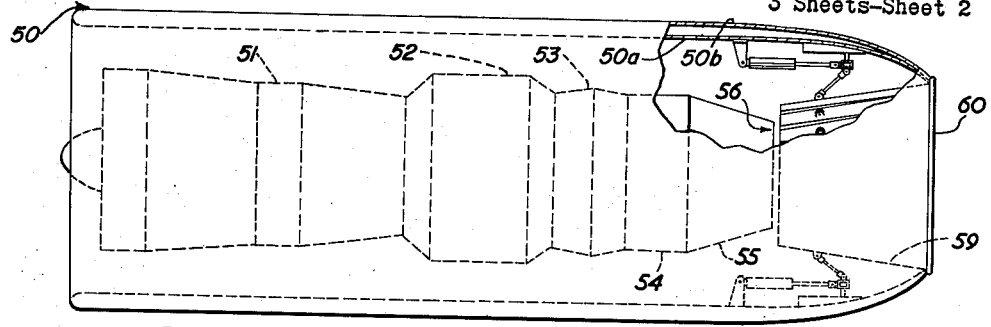
Figure 5:
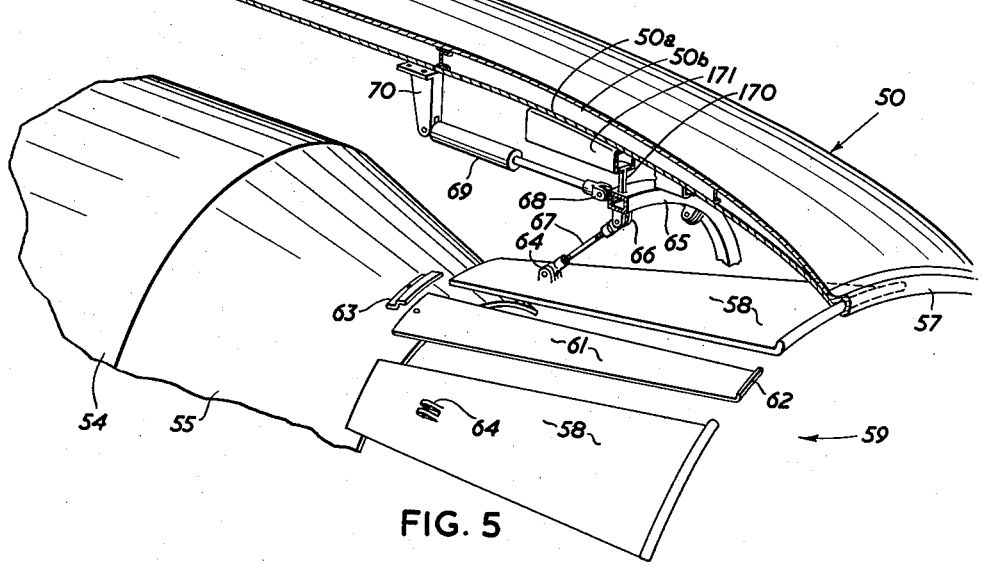
Figure 6:
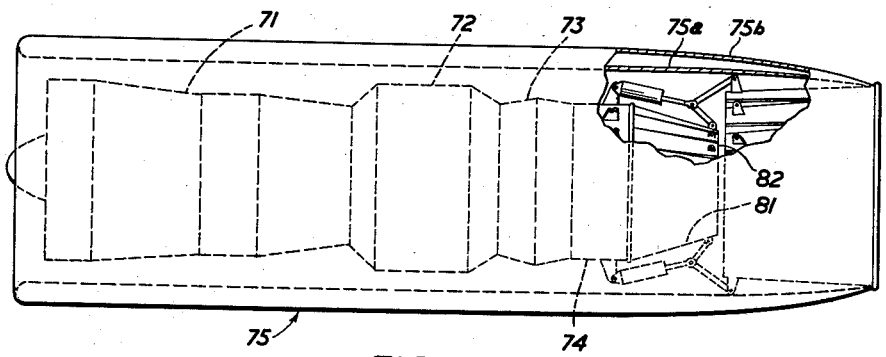
Figure 7:
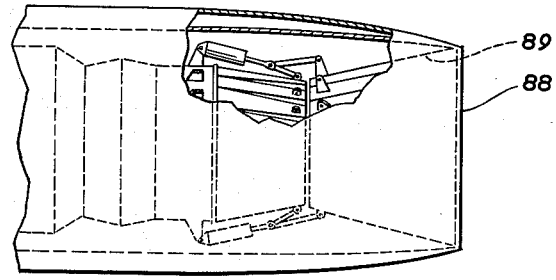
Figure 8:
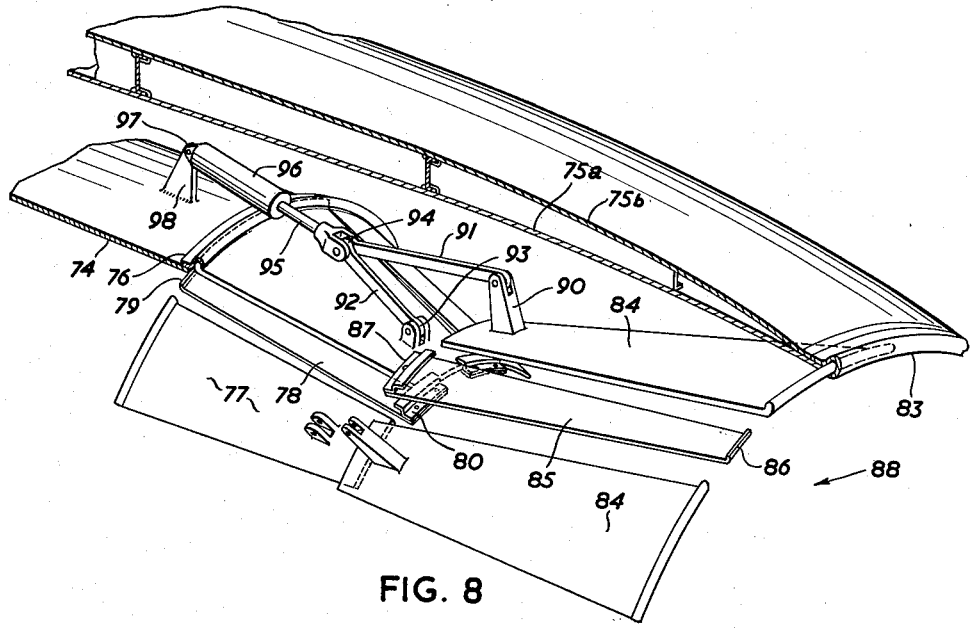
Figure 9:
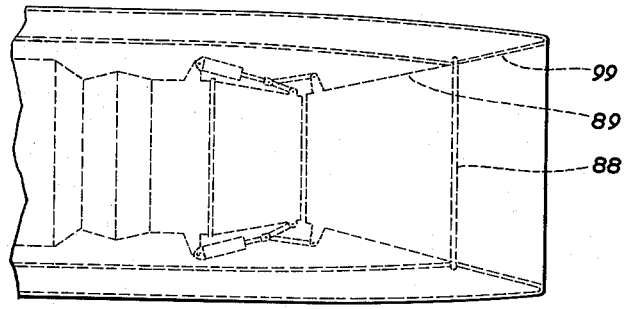

The invention will be described by way of example with reference to the accompanying drawings, in which like reference numerals indicate like parts throughout the several views, and in which;

Figure 1 is an elevation, partly broken away, of a nozzle system according to the invention applied to a gas turbine engine in a nacelle, Figure 2 is a detail perspective view, on a larger scale, of part of the nozzle system shown in Figure 1, Figure 3 is a detail cross-section showing the arrangement of the sealing strips between the nozzle flaps, Figure 4 is an elevation, partly broken away, of a gas-turbine engine in a nacelle and having a nozzle system according to a second embodiment of the invention, Figure 5 is a detail perspective, on a larger scale, of part of the nozzle system shown in Figure 4, Figure 6 is an elevation, partly broken away, of a gas-turbine in a nacelle and having a nozzle system according to a third embodiment of the invention, the system being shown in one of its limiting positions, Figure 7 is an elevation corresponding to part of Figure 6 and showing the nozzle system in the other of its limiting positions, Figure 8 is a detail perspective, on a larger scale, of the nozzle system shown in Figures 6 and 7, and Figure 9 is a detail elevation showing a modification of the system shown in Figures 6, 7 and 8.

Referring now to Figures 1, 2 and 3, a nacelle, indicated generally at 10, has inner and outer walls 11, and 12 respectively. Supported in the nacelle is a gas turbine engine having a compressor portion 13, a combustion chamber portion 14, a turbine portion 15 and a tail-pipe portion 16. The engine is supported in the nacelle by conventional means, not shown.

The downstream end of the tail-pipe 16 is provided with a machined ring 17 in which are pivotally mounted a series of annularly arranged, longitudinally extending flaps 18. The flaps 18 define a duct and converge to a throat 19 thus forming a variable convergent nozzle. Each flap 18 is provided with an enlarged hinge portion 20, see Figure 3, which is received in the machined ring 17, and a wire braid 21 is interposed between the hinge portion 20 and the ring 17 to provide a gas-tight seal. The clearances between the longitudinal edges of the flaps 18 are closed by sealing strips 22 having upturned ends 23, each strip being gripped in the ring 17 by the hinge portions 20 on an adjacent pair of flaps 18. Each sealing strip is thus prevented from moving longitudinally and is secured at its other end by a cranked strip 24 which embraces the other ends of the pair of flaps and is secured to the sealing strip 22 by a rivet 25. As the flaps 18 pivot in the ring 17, the clearances between their longitudinal edges will change and will be covered by the sealing strips 22.

The exterior surface of each flap 18 is provided with a cam member 26 and a unison ring 27 surrounds the convergent nozzle and carries rollers 28 which depend from trunnions 29 on the unison ring. The unison ring is pivotally connected, as at 30, to the piston rods of a plurality of hydraulic actuators, some of which are indicated at 31, the actuators in turn being pivoted, as at 32, to a ring 33 secured to the tail-pipe 16. The cam members 26 are profiled so that, as the unison ring moves in a downstream direction under the influence of the actuators 31, the throat area of the convergent nozzle is reduced. If the unison ring moves in an upstream direction then the convergent nozzle opens under the influence of the gas pressure within the nozzle and the throat area is increased.

The nacelle terminates at the rear in an aperture 34 having a cross-sectional area which is greater than the minimum cross-section area of the throat 19 of the convergent nozzle. In the majority of practical cases the cross-sectional area of the aperture 34 will be greater than the maximum cross-sectional area of the throat of the convergent nozzle but in all cases the cross-sectional area of the aperture will be greater than the minimum cross-sectional area of the throat.

The nacelle terminates in a ring 35 in which are mounted flaps 36 in a manner similar to that described with reference to the mounting of the flaps 18 in the ring 17. Sealing strips 37 having upturned ends 38 are mounted in the ring 35 and seal the clearance between the longitudinal edges of the flaps 36 in the same manner as the sealing members 22 seal the clearances between the longitudinal edges of the flaps 18. Cranked strips 39 retain the sealing strips 37 in place.

Each flap 36 is provided on its outer surface with a pair of spaced apertured lugs 40. A unison ring 41 surrounds the flaps and is provided on its inner surface with pairs of spaced apertured lugs 42. Radial links 43 are pivotally attached at their ends between the lugs of the pairs 40 and 42. The unison ring is pivotally attached, as at 44, to the piston rods of a plurality of circumferentially spaced actuators, one of which is shown at 45. The actuators are pivotally mounted on brackets 46 which are secured to the inner wall 11 of the nacelle. The unison ring 41 carries guides 47 which run in tracks 47a mounted on the inner wall 11 of the nacelle.

The flaps 36 define a duct 48 which terminates at its upstream end adjacent to the throat 19 of the convergent nozzle. As the unison ring 41 is moved in an upstream direction by the actuators 45, the links 43 will force the ends of the flaps 36 remote from the aperture to close in so that the cross-sectional area of the upstream end of the duct 48 will decrease. As the unison ring 41 is moved in a downstream direction by the actuators 45, the links 43 will pull the upstream ends of flaps 36 outwardly so that the cross-sectional area of the upstream end of the duct 48 will increase.

The operation of the embodiment described is as follows. During operation of the gas turbine engine, the propulsive gases will pass out through the convergent nozzle, through the throat 19 thereof, along the duct 48 defined by the flaps 36 and through the aperture 34. In the position shown in Figure 1, secondary air will flow along an annular passage 49 between the engine and the inner wall 11 of the nacelle and will then flow around the outside of the convergent nozzle and into the duct 48. In the position shown in Figure 1, the convergent nozzle and the duct 48 are in intermediate positions for an intermediate nozzle pressure ratio, the duct 48 forming a divergent ejector. For a low nozzle pressure ratio the cross-sectional area of the upstream end of the duct 48 will be opened up to provide a cylindrical or even slightly convergent ejector. For high pressure ratios, the cross-sectional area of the upstream end of the duct will be reduced until, in the limit, it is approximately equal to the cross-section of the throat 19 of the convergent nozzle. In this position, the system will act as a convergent-divergent nozzle. If the upstream end of the duct 48 is slightly larger in cross-sectional area than the area of the throat 19, there will be a slight ejector opening and the duct 48 will act as a film-cooled divergent ejector, a film of secondary air passing along the inner surfaces of the flaps 36. If, however, duct 48 is opened up slightly more, the divergent nozzle will act as a plain divergent ejector. The convergent nozzle will be operated to suit the conditions in the engine. For example, during normal flight with no afterburning, the convergent nozzle will be in an intermediate position, while, during afterburning at high flight speed, the convergent nozzle will be opened and upstream end of the duct 48 closed down.

Referring now to Figures 4 and 5, there is shown a second embodiment of the invention, in which a fixed throat convergent nozzle is used with flaps to provide a duct downstream of the nozzle, the upstream end of the duct being variable in cross-sectional area. A nacelle is indicated generally at 50 and has inner and outer walls 50a and 50b respectively. A gas turbine engine having a compressor section 51, a combustion chamber section 52, a turbine section 53 and a tail-pipe section 54 is supported within the nacelle. The tail-pipe 54 terminates in a fixed convergent nozzle 55 having a throat indicated generally at 56. The engine is mounted in the nacelle by conventional means, not shown. The nacelle terminates at the rear in a ring 57 in which are mounted an annularly arranged, longitudinally extending series of flaps 58 which define a duct indicated generally at 59. The ring 57 defines a fixed area aperture 60 which is of greater cross-sectional area than the throat 56 of the convergent nozzle 55.

Between each pair of flaps 58 is mounted a sealing strip 61, each strip having an upturned end 62, and being provided with a cranked strip 63. The flaps 58 and the sealing strip 61 are mounted in the ring 57 in a manner similar to that described for the flaps 18 and the sealing strips 22 in Figures 1, 2 and 3. Each flap 58 is provided on its outer surface with a pair of spaced apertured lugs 64. A unison ring 65 surrounds the duct 59 and is provided on its inner surface with pairs of spaced apertured lugs 66. Radial links 67 in the form of turnbuckles are pivotally mounted at their ends between the lugs of the pairs 64 and 66. The unison ring 65 is pivotally connected, as at 68, to the piston rods of a plurality of circumferentially spaced actuators, one of which is indicated at 69, each actuator in turn being pivoted to a bracket 70 secured to the inner wall 50a of the nacelle. Guides 170 of T-section are carried by the unison ring 65 and run in tracks 171 mounted on the inner wall 50a of the nacelle. The positions of the upstream ends of flaps 58 may be adjusted during assembly by adjustment of the lengths of the links 67. The minimum throat opening may be arranged to occur when the links 67 are in the plane of the unison ring 65. Since the minimum opening is likely to be the most critical this arrangement will have the advantage of ensuring that the area of the opening will be unaffected by small displacements of the actuators within their operating tolerances.

The operation of this embodiment of the nozzle system is very similar to the operation of the embodiment previously described. As the unison ring 65 is moved by the actuators 69 in an upstream direction the upstream ends of the flaps 58 are moved inwardly by the links 67 so that the upstream end of the duct 59 is reduced in area. Conversely, as the unison ring 65 moves in a downstream direction, the links 67 pull the upstream ends of the flaps 58 outwardly and thus increase the area of the upstream end of the duct. In the position shown in Figure 4 the nozzle system is set for an intermediate nozzle pressure ratio. If the nozzle pressure ratio increases, the upstream ends of the flaps 58 are moved inwardly so that the upstream end of the duct 59 substantially conforms to the size of the throat 56. If the upstream end of the duct is the same size as the throat, the system then acts as a convergent-divergent nozzle; if the upstream end of the duct is slightly larger than the throat 56 the system acts as a convergent nozzle with a film-cooled divergent ejector, and, if the upstream end of the duct has its area increased still more, the system acts as a convergent nozzle in combination with a divergent ejector.

Referring now to Figures 6, 7 and 8 there is shown a third embodiment of the invention wherein flaps forming a convergent nozzle are mechanically linked to flaps forming a duct downstream of the nozzle. A gas turbine engine having a compressor portion 71, a combustion chamber portion 72, a turbine portion 73 and tail-pipe 74, is mounted by conventional means, not shown, in a nacelle indicated generally at 75. The nacelle has inner and outer walls 75a and 75b respectively.

The tail-pipe 74 terminates at its downstream end in a ring 76 in which are mounted flaps 77. The clearances between the longitudinal edges of the flaps 77 are closed by sealing strips 78 having upturned ends 79 and cranked strips 80. The arrangement of the flaps 77 and strips 78 is similar to the arrangement of flaps and strips 18 and 22 in the embodiment shown in Figures 1, 2 and 3. The flaps 77 define a duct 81 converging to a throat 82 and form a variable convergent nozzle.

The nacelle terminates in a ring 83 in which are mounted flaps 84 and sealing strips 85 having upturned ends 86 and cranked strips 87. The arrangement of the flaps 84 and sealing strips 85 is similar to the arrangement of the flaps 36 and the strips 37 in the embodiment described with reference to Figures 1, 2 and 3. The ring 83 defines an aperture 88 having a larger cross-sectional area than the maximum area of the throat 82, shown in Figure 7. The flaps 84 define a duct 89 terminating in the aperture 88.

Each flap 84 has a bracket 90 upstanding from the outer surface thereof. Links 91 are pivotally secured to the brackets 90 and links 92 are pivotally mounted at 93 to the flap 77. A pivotal joint 94 is provided between each pair of links 91 and 92 and is connected to the piston rod 95 of a hydraulic actuator 96. Each actuator 96 is pivotally mounted, as at 97, to a standard 98 welded to the tail-pipe 74 and an actuator is provided for each pair of flaps 77, 84.

The operation of this embodiment is similar to the operation of the embodiments previously described, except that both the flaps 77 of the convergent nozzle and the flaps 84 of the divergent section operate in synchronism. Thus, in one limiting position of the nozzle system shown in Figure 6, the convergent nozzle is fully closed down and the flaps 84 are fully opened so that the duct 89 provides a substantially cylindrical ejector. This arrangement would be used for operation with no afterburning at a low speed. When the afterburner is started, the convergent nozzle is opened up and the duct 89 closed down to form a divergent ejector or, in the limit, a convergent-divergent nozzle as shown in Figure 7. In the position shown in Figure 7, the nozzle system is suitable for high speed flight, i.e. when there is a high nozzle pressure ratio across the nozzle.

In the modification shown in Figure 9, a further length of divergent duct indicated at 99 is provided downstream of the aperture 88 in the nacelle and the upstream end of the duct 99 has a cross-section which is equal to the cross-section of the aperture. The divergent section of duct 99 is of use at high nozzle pressure ratios, i.e. in high speed flight, and may be caused to have excellent high pressure ratio performance, combined with a very light weight. The provision of this divergent section may cause the nozzle system to act rather less efficiently at low nozzle pressure ratios.

The ejector flow at low and medium pressure ratios which is required may be used not only for cooling the engine but may also usefully suck the boundary layer from the aircraft or the nacelle and thus reduce drag. If the sucked air is taken from the surface of the engine nacelle at some point close to the nozzle system, the control for admitting the boundary layer could be synchronised with the control of the cross-sectional area of the upstream end of the ejector duct.

It will be seen that the invention provides a nozzle system which is very versatile and which is capable of efficient operation over a wide range of nozzle pressure ratios. The nozzle system is simple and of light weight and attains the majority of advantages of a fully variable convergent-divergent nozzle without the penalty of weight and expense associated with such a fully variable nozzle.

The means shown in Figure 1 for actuating the flaps 18 of the convergent nozzle is more fully described and is claimed in copending application No. 727,182 of John Alan Courteny Hyde, Arthur Edward Pashley and Joseph Thompson Purvis filed April 8, 1958.

It will be understood that the form of the invention herewith shown and described is a preferred example and various modifications can be carried out without departing from the spirit of the invention or the scope of the appended claims.

What I claim as my invention is:

1. A propulsive nozzle system for a reaction propulsion unit, comprising an inner pipe to receive high velocity primary gas from said unit, an outer pipe surrounding the inner pipe to provide an annular passage between the pipes for connection to a source of secondary gas, a first plurality of annularly arranged, longitudinally extending flaps pivotally attached at their one ends to the downstream end of the inner pipe, the flaps defining a first duct converging to terminate at the other ends of the flaps in a throat, the outer pipe terminating downstream of the throat in a fixed size aperture having a cross-sectional area greater than the minimum cross-sectional area of said throat, a second plurality of annularly arranged, longitudinally extending flaps pivotally attached at their one ends to the outer pipe adjacent to the edge of the aperture, the flaps extending upstream from the edge to define a second duct within the outer pipe, the upstream end of the said second duct being adjacent to the throat, and defining therewith an ejector passage communicating with said annular passage, and means to pivot the flaps of both pluralities in synchronism to simultaneously vary the area of the throat and the area of the upstream end of the second duct; the area of one of said throat and said upstream end increasing as the area of the other thereof decreases to thereby vary the area of the ejector passage.

2. A propulsive nozzle system for a reaction propulsion unit, comprising an inner pipe to receive high velocity primary gas from said unit, an outer pipe surrounding the inner pipe to provide an annular passage between the pipes for connection to a source of secondary gas, a first plurality of annularly arranged longitudinally extending flaps pivotally attached at their one ends to the downstream end of the inner pipe, the flaps defining a first duct converging to terminate at the other ends of the flaps in a throat, the outer pipe terminating downstream of the throat in a fixed size aperture having a cross-sectional area greater than the minimum cross-sectional area of said throat, a second plurality of annularly arranged longitudinally extending flaps pivotally attached at their one ends to the outer pipe adjacent to the edge of the aperture, the flaps extending upstream from the edge to define a second duct within the outer pipe, the upstream end of said second duct being adjacent to the throat and defining therewith an ejector passage communicating with said annular passage, links pivotally attached to the flaps of the first plurality adjacent to said other ends thereof, further links pivotally attached to the flaps of the second plurality adjacent to the other ends thereof, pivotal joints between the links attached to the flaps of the first plurality and the links attached to the flaps of the second plurality, and means to move the pivotal joints to simultaneously vary the area of the throat and the area of the upstream end of the second duct, the area of one of said throat and said upstream end increasing as the area of the other thereof decreases to thereby vary the area of the ejector passage.

3. A propulsive nozzle system for a reaction propulsion unit, comprising an inner pipe to receive high velocity primary gas from said unit, an outer pipe surrounding the inner pipe to provide an annular passage between the pipes for connection to a source of secondary gas, a first plurality of annularly arranged, longitudinally extending flaps pivotally attached at their one ends to the downstream end of the inner pipe, the flaps defining a first duct converging to terminate at the other ends of the flaps in a throat, the outer pipe terminating downstream of the throat in a fixed size aperture having a cross-sectional area greater than the maximum cross-sectional area of said throat, a second plurality of annularly arranged, longitudinally extending flaps pivotally attached at their one ends to the outer pipe adjacent to the edge of the aperture, the flaps extending upstream from the edge to define a second duct within the outer pipe, the upstream end of said second duct being adjacent to the throat and defining therewith an ejector passage communicating with said annular passage, and means to pivot the flaps of both pluralities in synchronism to simultaneously vary the area of the throat and the area of the upstream end of the second duct; the area of one of said throat and said upstream end increasing as the area of the other thereof decreases to thereby vary the area of the ejector passage.

4. A propulsive nozzle system for a reaction propulsion unit, comprising an inner pipe to receive high velocity primary gas from said unit, an outer pipe surrounding the inner pipe to provide an annular passage between the pipes for connection to a source of secondary gas, a first plurality of annularly arranged longitudinally extending flaps pivotally attached at their one ends to the downstream end of the inner pipe, the flaps defining a first duct converging to terminate at the other ends of the flaps in a throat, the outer pipe terminating downstream of the throat in a fixed size aperture having a cross-sectional area greater than the maximum cross-sectional area of said throat, a second plurality of annularly arranged, longitudinally extending flaps pivotally attached at their one ends to the outer pipe adjacent to the edge of the aperture, the flaps extending upstream from the edge to define a second duct within the outer pipe, the upstream end of said second duct being adjacent to the throat and defining therewith an ejector passage communicating with said annular passage, links pivotally attached to the flaps of the first plurality adjacent to the other ends thereof, further links pivotally attached to the flaps of the second plurality adjacent to the other ends thereof, pivotal joints between the links attached to the flaps of the first plurality and the links attached to the flaps of the second plurality, and means to move the pivotal joints to simultaneously vary the area of the throat and the area of the upstream end of the second duct, the area of one of said throat and said upstream end increasing as the area of the other thereof decreases to thereby vary the area of the ejector passage.

5. A propulsive nozzle system for a reaction propulsion unit, comprising an inner pipe to receive high velocity primary gas from said unit, an outer pipe surrounding the inner pipe to provide an annular passage between the pipes for connection to a source of secondary gas, a first plurality of annularly arranged, longitudinally extending flaps pivotally attached at their one ends to the downstream end of the inner pipe, the flaps defining a first duct converging to terminate at the other ends of the flaps in a throat, the outer pipe terminating downstream of the throat in a fixed size aperture having a cross-sectional area greater than the minimum cross-sectional area of said throat, a second plurality of annularly arranged, longitudinally extending flaps pivotally attached at their one ends to the outer pipe adjacent to the edge of the aperture, the flaps extending upstream from the edge to define a second duct within the outer pipe, the upstream end of said second duct being adjacent to the throat and defining therewith an ejector passage communicating with said annular passage, means to pivot the flaps of both pluralities in synchronism to simultaneously vary the area of the throat and the area of the upstream end of the second duct, the area of one of said throat and said upstream end increasing as the area of the other thereof decreases to thereby vary the area of the ejector passage, and a further length of duct at the downstream end of the outer pipe, said further length of duct diverging from its upstream to its downstream end and the cross-section of the upstream end of said further length of duct being equal to the cross-section of said aperture.

References Cited in the file of this patent

UNITED STATES PATENTS

| | | |
|---|---|---|
| 2,575,683 | Price | Nov. 20, 1951 |
| 2,597,253 | Melchior | May 20, 1952 |
| 2,625,008 | Crook | Jan. 13, 1953 |
| 2,770,944 | Jordan | Nov. 20, 1956 |
| 2,900,789 | Philpot | Aug. 25, 1959 |
| | (Corresponds to British Patent 788,360) | |
| 2,914,914 | Vandenberg | Dec. 1, 1959 |

FOREIGN PATENTS

| | | |
|---|---|---|
| 1,086,315 | France | Aug. 11, 1954 |
| 788,360 | Great Britain | Jan. 2, 1958 |